United States Patent [19]

Dinnebier et al.

[11] Patent Number: 5,069,558
[45] Date of Patent: Dec. 3, 1991

[54] AIR-SUPPORTED LAYING ROLLER FOR TEXTILE YARN

[75] Inventors: Franz Dinnebier, Niederwerrn; Hans Hermanns, Hammelburg, both of Fed. Rep. of Germany

[73] Assignee: FAG Kugelfischer Georg Schafer, Fed. Rep. of Germany

[21] Appl. No.: 614,634

[22] Filed: Nov. 16, 1990

[30] Foreign Application Priority Data

Nov. 25, 1989 [DE] Fed. Rep. of Germany ....... 3939004

[51] Int. Cl.[5] .............................................. F16C 32/06
[52] U.S. Cl. ...................................... 384/115; 384/902
[58] Field of Search ............... 384/115, 113, 279, 902, 384/100, 119

[56] References Cited

U.S. PATENT DOCUMENTS 3,447,844  6/1969  Weichsel .............................. 384/279
3,753,517  8/1973  Takenaka et al. .................... 384/115
4,838,710  6/1989  Ohta et al. ............................ 384/902

FOREIGN PATENT DOCUMENTS 2003345  7/1970  Fed. Rep. of Germany.
2134247  1/1973  Fed. Rep. of Germany.

Primary Examiner—Lenard A. Footland
Attorney, Agent, or Firm—Ostrolenk, Faber, Gerb & Soffen

[57] ABSTRACT

A laying roller for textile yarns which, via a central air supply, supplies two air feed channels which are separated from each other. Each channel feeds air via a respective one of two porous sintered bearing bushings which are axially separated from each other. The air passing through the porous bushings builds up an air cushion for supporting a surrounding roller shell.

20 Claims, 2 Drawing Sheets

I-I

II-II

AIR-SUPPORTED LAYING ROLLER FOR TEXTILE YARN

BACKGROUND OF THE INVENTION

The present invention relates to an air-supported laying roller for textile yarns, the roller being fed from a central air supply to the central shaft and being provided with an air cushion to the roller shell via porous bearing bushings between the shaft and the shell.

A laying roller has textile yarn wound on its outer shell and the removal of the yarn spins the shell around the central support or shaft of the roller and unwinds the yarn. An air cushion supports the shell as it rotates. A number of such laying rollers have become known.

Federal Republic of Germany OS 21 34 247 discloses a laying roller in which air is supplied via the shaft, which is strengthened in the region of the roller shell. A plurality of annular rows of radial holes in the shaft cause the emergence of air to the inside diameter of the shell. For axial stabilization, holes are also provided in the ends of the shaft. These holes permit the emergence of air which presses against bucket wheel like disks which are pressed into the roller shell.

The four local air outlets at the ends of the shaft do not permit a balanced air cushion inside the shell, because the air can escape from the shaft and from inside the shell in an uncontrolled fashion. The annular rows of holes, each of a plurality of radially arranged holes, do not contribute to a balanced air cushion either. Another disadvantage is the large pressure space within which the air must be compressed. Experience has shown that a pressure drop occurs at the rear series of air outlet openings. The result of this is metallic shell to shaft contact and thus failure of the laying roller.

Federal Republic of Germany OS 20 03 345 discloses a ceramic air bearing in the form of a laying roller. In this case, an air cushion results from the relative speed of the roller shell with respect to the stationary ceramic part inside the shell. Outside air is not used here. Axial stabilization is effected via small magnet plates. The danger of contact between the ceramic part and the roller shell is present here to even a greater extent than in the previously described embodiment. In particular, contact cannot be avoided upon the starting and stopping of the roller. Failure after a short period of travel is virtually certain here.

SUMMARY OF THE INVENTION

The object of the present invention is to provide a functional air supported laying roller having a uniform balanced air cushion supplied from a central air feed.

With the laying roller of the invention, uniform distribution of air is obtained via two axially spaced apart, annular, porous, sintered metal bearing bushings which are arranged at a certain axial distance from each other. The bearing bushings are disposed in the front and rear thirds of the laying roller. The two bearing bushings are separated by a non-ferrous, impervious spacer bushing and the bushings are also fixedly connected to the shaft by the spacer bushing. Each bearing bushing has its own air feed channel. There are respective radial holes in the shaft and these holes are arranged axially centrally with respect to and inside each bearing bushing to permit the emergence of the air to the insides of the bushings. The air is distributed in a chamber developed around the outside of the shaft inside each bushing. In this way, uniform pressure is exerted on and around each bearing bushing. The air is distributed uniformly in all directions around and then through the bearing bushings to the inside of the roller shell, and this forms the air cushions for the outer shell of the roller. The porous bushings provide axial stabilization due to the air cushions produced thereby. The spacer bushing provides a stabilization zone located centrally between the two porous bearing bushings. This stabilization is further supported by air returns which, at the beginning and end, provide for an air cushion via limiting disks.

The porous bushings are of sintered metal or the like, thin enough to pass air uniformly and thick enough to be rigid and stiff. The exterior of the central shaft is shaped to cooperate with the interiors of the porous bushings to define respective first and second air distribution chambers radially inside the first and second porous bushings. The bushings are stationary on the shaft and the roller shell rotates around the air cushions radially outside the porous bushings.

There is a central air feed into the shaft and then a separator in the shaft separates the air into first and second air feed channels for respectively supplying the first and second porous bushings. There is preferably a single first air passage from the first air feed channel to the first chamber inside the first bushing and a single second air passage from the second air feed channel to the second chamber inside the second bushing. The first and second air passages are preferably arranged 180° apart around the shaft. The porous bushings help distribute the air uniformly in the first and second chambers and the uniformly distributed air passes uniformly through the porous bushing to define the air cushions.

At the end of the roller shell are axial limiting disks. These are axially spaced from the axial outer ends of the porous bushings and define their air cushions which axially stabilize the roller shell on the shaft and around the bushings.

The separator in the shaft for separating the first and second air feed channels comprises a wall which essentially diametrically bisects the interior of the shaft. A lobe at one side of the wall defines the floor of the first air feed channel and a lobe at the other side of the wall defines the floor of the second air feed channel.

Other features and advantages of the present invention will become apparent from the following description of a preferred embodiment of the invention which refers to the accompanying drawings.

BRIEF DESCRIPTION OF THE DRAWINGS

The invention is explained in further detail below with reference to one embodiment.

DETAILED DESCRIPTION OF A PREFERRED EMBODIMENT

Figure 1:
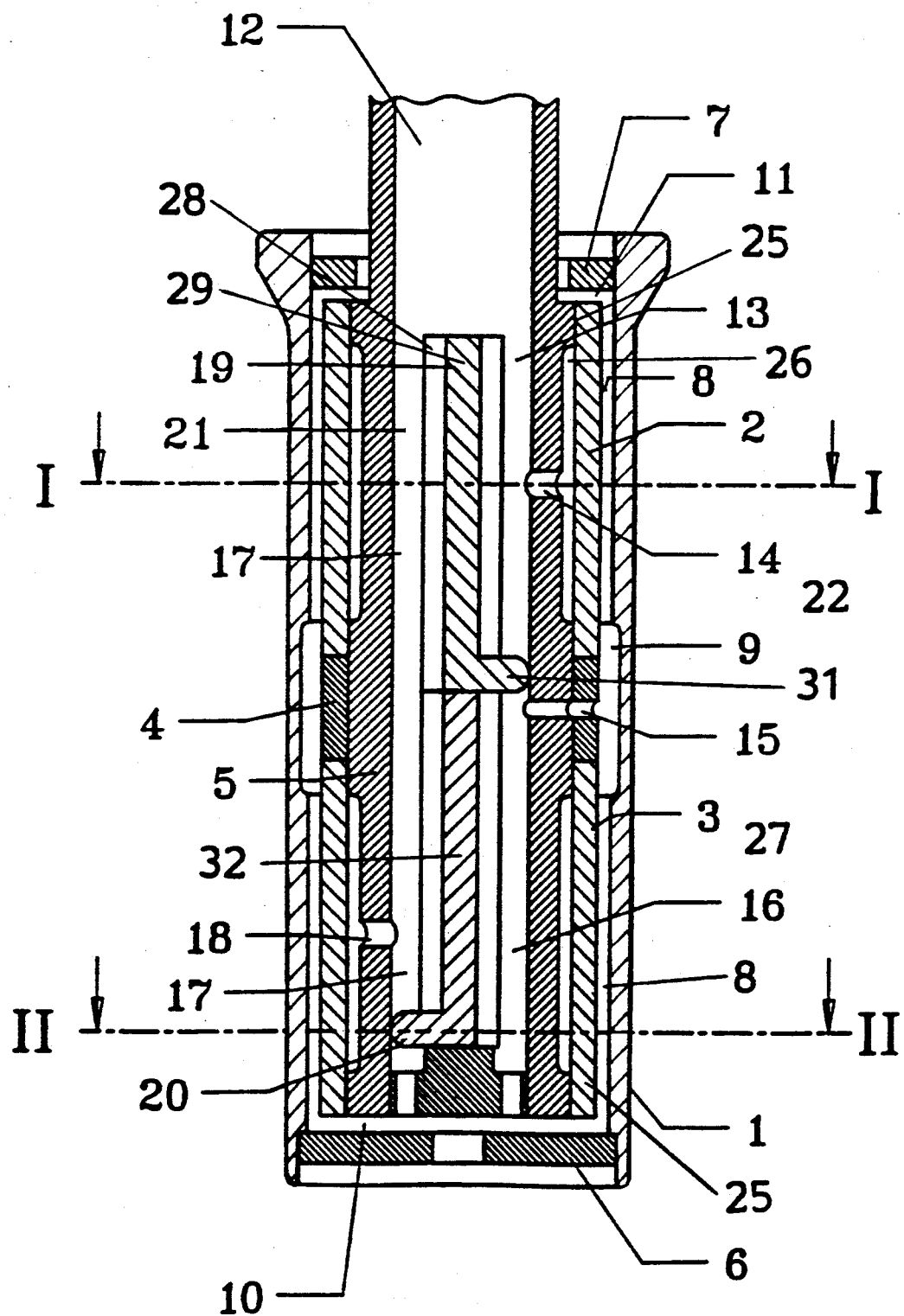
FIG. 1 is a sectional view of the laying roller of the invention.

FIG. 1 is a cross section through a laying roller according to the invention. The hollow, rigid, cylindrical shell 1 of the roller rotates around the axis of the roller. The shell has an exterior on and off which textile yarn is wound. The shell has an interior facing in toward the bushings. The remaining elements of the roller remain stationary with reference to rotation of the shell. The below described air cushions 8 support the roller shell for rotation.

Centrally disposed within the shell 1 is a stationary, hollow, air impervious, rigid shaft 5. Within the shaft are arranged the central air feed channel 12, which receives air from a central source, not shown, a first air feed channel 13 for the rear or upper bearing bushing 2 and the separate second air feed channel 17 for the front or lower bearing bushing 3.

The porous upper and lower bearing bushings 2 and 3 are firmly attached to the opposite axial sides of the non-ferrous, air impervious, spacer bushing 4. The bushing 4 is completely supported on the axially central radially outward step 24 of the multiply stepped shaft 5. The axially outward ends of the bushings 2 and 3 are supported on radially outward steps 25 and on the central step 24 formed on the exterior of the shaft, producing annular, narrow radial width, open, first and second chambers 26 and 27 in which the air exiting from the air feed channels 13, 14 and 17, 18 is first distributed completely between the shaft and the bushings 2 and 3 before passing through the bushings 2 and 3, as discussed below. The steps 24 and 25, the shaft exterior and the bushing interiors enclose the chambers 26, 27 for assuring uniform air distribution. The chambers 26 and 27 are annular and they are intended to permit uniform passage and distribution of the air exiting the first and second outlets 14 and 18 around the respective chambers 26 and 27 and to enable uniformly distributed passage of air through each of the porous bushings 2 and 3. The radial air outlets 14 and 18 for the bushings 2 and 3, respectively, are arranged 180° apart, which is preferable for balance, but not required. More than one such outlet 14 and 18 for each bushing may be provided, although one suffices for supplying the distribution chambers 26 and 27.

The bushings 2 and 3 are each comprised of porous, sintered metal material so that they easily pass air through themselves. They are thick enough to be stiff and rigid and to allow air to distribute throughout chambers 26 and 27, yet they are thin and porous enough to pass air outward substantially uniformly and to assure that an air cushioning and air bearing function are achieved for the shell 1. A common air cushion 8 develops between the interior surface of the shell 1 on which the contact surface for the roller shell 1 for yarn is defined and the exteriors of the bushings 2, 3 and 4. The air cushion includes an axially central stabilization zone 9 which is between the two axially separated sides of the air cushion 8. The zone 9 is fed by the narrow throttling outlet 15 which does not supply pressure but chokes the outgoing air to the zone 9.

There are limiting disks 6 and 7 fixed at the opposite axial ends of the shell 1 which enclose the ends of the air cushion 8. Axial end air cushions 10 and 11 develop between the limiting disks 6 and 7 and the axial ends of the bearings 2 and 3 and the steps 25 to also provide axial stabilization. The air cushions 10 and 11 are fed via the air returns 15 and 16.

Figure 2:
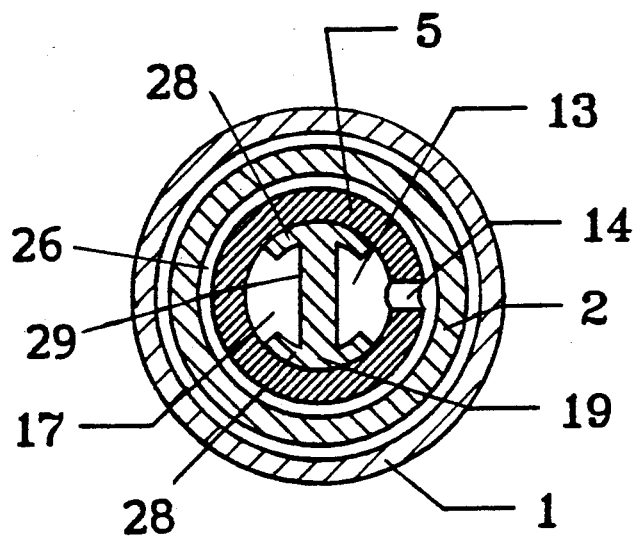
FIG. 2 is a cross section through the laying roller along the section line I—I.

There is a two part axially extending, and also generally diametrically extending, separator 19, 22 which essentially bisects the circular bore 21 of the shaft 5. The separator defines the air feed channels 13 and 17 there. The separator is shown in the two parts 19, 22 illustrated for ease of manufacture. It can be a one piece separator as well. The shape of the separator can be appreciated by viewing all three drawing Figures. As shown in FIG. 2, which is taken at section I—I, the upper part 19 of the separator is generally "I" shaped with rounded end bars 28 having an external periphery that seats air sealingly against the interior surface of the bore 21 of the shaft 5. The central leg 29 of the upper part 19 divides the air feed into the separate air feed channels 13 and 17 for the bushings 2 and 3, respectively. FIG. 2 shows that the upper bushing 2 is annular and surrounds the shaft 5 and defines the air distribution chamber 26 between the bushing 2 and the shaft 5. At the bottom end of the upper separator part 19, there is an outwardly directed, essentially semicircular lobe 31, which defines the floor of the first air feed chamber 13. The shape of that lobe 31 is the same as that of lobe 20, in FIG. 3, which serves as the floor of the lower section 32 of the separator.

The lower section 32 of the separator 19 also has a generally "I" shaped cross-section main portion and its bottom end or floor is an essentially semicircular lobe 20 which closes the bottom of the air feed chamber 17. That chamber 17 feeds the air distribution chamber 27 through the outlet 18. The shaft 5 is also surrounded by the lower bushing 3 to define the annular air distribution chamber 27.

The separator lobes 31 and 20 are essentially similarly shaped but are directed in opposite directions for closing the bottoms of their respective air feed channels 13 and 17. The separator sections 19 and 32 are identical, but arranged in opposite or mirror orientations with their central legs aligned. The central legs and the end bars of the separator sections are aligned axially.

FIG. 2 shows, in section I—I, the single radial air outlet 14, at the chamber 26, to the rear bearing bushing 2, which is fed via the air channel 13. The air channel 17 for the front bearing bushing 3 is seen. In a view in the direction I—I, the separator lobe 31 would be visible. But it has been omitted from FIG. 2 so that the shapes of the elements are more easily seen.

Figure 3:
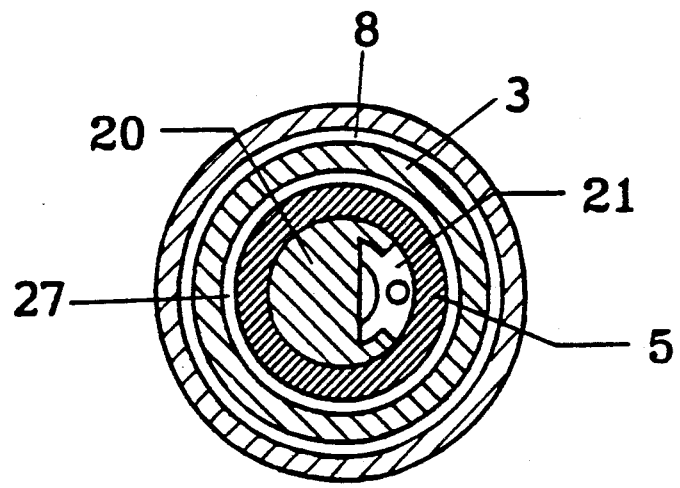
FIG. 3 is a cross section through the laying roller along the section line II—II.

FIG. 3 also shows in section II—II the radial support of the separator lobe 20 in the bore 21 of the shaft 5, as well as the closing of the air feed channel 17 by the lobe 20.

There is no drive on the roller for rotating the shell 1 around the air cushions and the shaft. Instead, the shell is rotated by external means, if desired, for winding the yarn onto the shell (or the yarn may be wound on to the shell which is then stationary). Similarly, when the yarn is being removed from the shell, pulling on the yarn will unwind it by causing the shell to freely rotate.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. An air-supported laying roller for textile yarn comprising:
   a central shaft, first and second separated air feed channels through the central shaft;
   a first porous bushing extending around the outside of the shaft and spaced from the shaft for defining a first air distribution chamber around the exterior of the shaft and inside the interior of the bushing;
   a second porous bushing also extending around the outside of the shaft, spaced from the shaft and axially away from the first porous bushing for defining a second air distribution chamber around the exterior of the shaft and inside the interior of the bushing;

a first air passage from the first air feed channel to the first chamber inside the first porous bushing for delivering air for distribution through the first chamber;

a second air passage from the second air feed channel to the second chamber inside the second porous bushing for delivering air for distribution through the second chamber;

a roller shell disposed outside the shaft and the bushings, having an exterior on which textile yarn may be laid and having an interior of a dimension so as to be spaced from the exterior of the porous bushings;

the porous bushings being porous for permitting passage therethrough and uniform distribution of air from the respective first and second chambers within the porous bushing to define a respective first and second air cushion around the exterior of the first and second bushings, respectively and inside the interior of the roller shell, and the first and second air cushions serving as an air bearing for the shell to rotate around the porous bushings and the shaft.

2. The air-supported laying roller of claim 1, wherein the porous bushings are supported on the central shaft and remain stationary with the central shaft and the shell is rotatable around the porous bushings and the central shaft.

3. The air-supported laying roller of claim 2, comprising respective first supports on the shaft for supporting the first porous bushing and respective second supports on the shaft for supporting the second porous bushing, the first and second supports for the respective bushings being axially spaced apart for defining between the respective supports of the first and second bushings the respective first and second chambers located radially inside the porous bushings.

4. The air-supported laying roller of claim 2, further comprising a respective axial limiting disk at both axial ends of the shell and disposed beyond the opposite axial ends of the bushings and in engagement with the shell and rotatable with the shell.

5. The air-supported laying roller of claim 4, further comprising means in the shaft for defining an air return at the axial ends of the porous bushings between the bushings and the axially neighboring limiting disks for providing axial air cushions between the limiting disks and the axially outward ends of the first and second bushings.

6. The air-supported laying roller of claim 5, wherein the means for defining an air return comprises an air return pathway comprising two openings from at least one of the air feed channels into the axial air cushions between the limiting disks and the bushings.

7. The air-supported laying roller of claim 2, further comprising the shell, the shaft and the porous bushings being so shaped and placed as to define an axial stabilization zone which is axially between the first and second bearing bushings around the shaft and inside the shell.

8. The air-supported laying roller of claim 7, further comprising a non-porous spacing bushing attached to the shaft and present in the axial region of the stabilization zone between the first and second bushings.

9. The air-supported laying roller of claim 8, wherein the spacing bushing is comprised of a non-ferrous material.

10. The air-supported laying roller of claim 8, wherein the spacing bushing is comprised of a non-ferrous material.

11. The air-supported laying roller of claim 1, further comprising a central air feed for connection to a central air supply, and the central air feed communicating into the shaft and from there communicating with the first and second air feed channels.

12. The air-supported laying roller of claim 1, wherein there is a single first air passage from the first air feed channel to the first chamber and there is a single second air passage from the second air feed channel to the second chamber.

13. The air-supported laying roller of claim 12, wherein the first and second air passages are arranged 180° apart around the shaft.

14. The air-supported laying roller of claim 1, wherein the shaft has a hollow interior and further comprising a separator extending axially through the interior of the shaft for separating the first and second air feed channels and for directing air from the first feed channel out the first air passage and air from the second feed channel out the second air passage.

15. The air-supported laying roller of claim 14, wherein the separator comprises a first part which separates the first and second air feed channels and including a first floor, which defines one end of the first air feed channel, and a top end which is open toward the central air feed; and a second part axially next to the first part, the second part also separates the first and second air feed channels and includes a second floor, which defines one end of the second air feed channel, and a respective top end which is also open toward the central air feed.

16. The air-supported laying roller of claim 15, wherein each of the first air feed channel and the second air feed channel occupies approximately one-half the interior of the shaft.

17. The air-supported laying roller of claim 16, wherein the first floor of the first part of the separator extends over the bottom of the entire open space of the first air feed channel; and the second floor of the second part of the separator extends over the bottom of the entire open space of the second air feed channel.

18. The air-supported laying roller of claim 15, wherein the separator first and second parts are separate pieces disposed one axially above the other in the shaft interior.

19. The air-supported laying roller of claim 18, wherein the first and second floors are oriented at 180° offset from each other.

20. The air-supported laying roller of claim 19, wherein the first and second parts of the separator are identical, but arranged in mirror image 180° offset orientations.

* * * * *